United States Patent [19]
Hara

[11] Patent Number: 5,396,681
[45] Date of Patent: Mar. 14, 1995

[54] WIPER APPARATUS INCLUDING WELDED MOUNTING BRACKET

[75] Inventor: Masami Hara, Aichi, Japan

[73] Assignee: Asmo Co., Ltd., Shizuoka, Japan

[21] Appl. No.: 120,357

[22] Filed: Sep. 14, 1993

[30] Foreign Application Priority Data

Oct. 30, 1992 [JP] Japan .................... 4-81504 U

[51] Int. Cl.$^6$ ................ B60S 1/06; B60S 1/04; B23K 11/14
[52] U.S. Cl. ................... 15/250.31; 15/250.30; 15/250.001; 219/93; 403/270
[58] Field of Search ........... 15/250.31, 250.30, 250.27, 15/250.001, 250.34; 296/192; 248/200, 214; 403/270, 271, 272, 265; 74/42, 43, 51, 96; 228/177; 219/93

[56] References Cited

U.S. PATENT DOCUMENTS

| | | | |
|---|---|---|---|
| 904,540 | 11/1908 | Lachman | 219/93 |
| 928,701 | 7/1909 | Rietzel | 219/93 |
| 1,822,197 | 9/1931 | Bowlus | 219/93 |
| 1,872,394 | 8/1932 | Bleicher | 219/93 |
| 4,427,869 | 1/1984 | Kimura et al. | 219/93 |
| 5,074,613 | 12/1991 | Unterborn et al. | 15/250.31 |
| 5,222,706 | 6/1993 | Hoshino | 15/250.31 |
| 5,261,286 | 11/1993 | Hayashi | 15/250.30 |

*Primary Examiner*—David A. Scherbel
*Assistant Examiner*—Gary K. Graham
*Attorney, Agent, or Firm*—Fisher & Associates

[57] ABSTRACT

A wiper apparatus is disclosed in which a wiper linkage includes a pivot lever connected to a pivot shaft of a wiper arm for wiping a windshield glass of a vehicle, a pivot holder for supporting a pivot shaft, a link rod rotatably connected to the pivot lever, and a crank arm rotatably connected to the link rod. A wiper motor rotates the crank arm and moves the link rod reciprocatively. An elongated supporting pipe is fixed to the vehicle and supports the wiper linkage. A holding member holds the wiper motor to the supporting pipe. The holding member includes a mounting member to which the wiper motor is mounted and a fixing member for fixing the mounting member to the supporting pipe. The fixing member has a plurality of protruding portions which are elongated in a longitudinal direction of the supporting pipe on the inner periphery of the fixing member facing the supporting pipe. Also, each of the plurality of protruding portions provides a weld portion between the fixing member and the supporting pipe.

20 Claims, 2 Drawing Sheets

WIPER APPARATUS INCLUDING WELDED MOUNTING BRACKET

BACKGROUND OF THE INVENTION

1. Field of the Invention

The present invention relates to a wiper apparatus which is installed on a vehicle or the like, and particularly to a wiper apparatus in which a holding member for holding a wiper motor and an elongated supporting pipe fixed to a vehicle body and supporting a wiper linkage, are welded together.

2. Description of the Related Art

Conventionally, in a wiper apparatus installed on a vehicle or the like, a wiper motor is fixed with mounting members, such as bolts and nuts, to a mounting portion of a holding member which comprises the mounting portion and a grip portion. On the inner periphery of the grip portion, a plurality of protruding portions is provided, each with a substantially spherical shape formed by embossing. A weld portion is respectively formed between each of the plurality of protruding portions and an elongated supporting pipe for supporting a wiper linkage fixed to a vehicle body, thereby causing the wiper motor to be held by the holding member and the supporting pipe to the wiper linkage.

However, with the aforementioned arrangement, when a load is imparted to the wiper linkage, e.g., due to the locking of the wiper arm, and vibration of the vehicle body during running of the vehicle, moment in a circumferential direction of the supporting pipe may be generated in the mounting portion of the holding member which holds the wiper motor. As a result, the bending moment which is accompanied with the aforementioned moment is generated in the weld portions between the grip portion and the supporting pipe. Since the aforementioned weld portion comprises a plurality of substantially spherical protruding portions, i.e., it is formed by spot welding, sufficient welding strength against the bending moment cannot be obtained on the weld portion between the holding member and the supporting pipe. As a result, it was not reliability sufficient for holding the wiper motor to the wiper linkage.

SUMMARY OF THE INVENTION

With the aforementioned circumstances in view, it is an object of the present invention to provide a reliable wiper apparatus with enhanced welding strength, in a circumferential direction of a supporting pipe, of a holding member which holds a wiper motor and a supporting pipe fixed to a vehicle body and supporting a wiper linkage.

The present invention provides a wiper apparatus, which comprises: a wiper linkage including a pivot lever which is connected to a pivot shaft of a wiper arm for wiping a windshield glass of a vehicle body, a pivot holder supporting the pivot shaft, a link rod which is rotatably connected to the pivot lever, and a crank arm connected rotatably to the link rod; a wiper motor which rotates the crank arm and moves the link rod reciprocatively; an elongated supporting pipe fixed to the vehicle body and supporting the wiper linkage; and holding means for holding the wiper motor to the supporting pipe; wherein the holding means includes a mounting member to which the wiper motor is mounted and a fixing member for fixing the mounting member to the supporting pipe; wherein the fixing member includes a plurality of protruding portions which are elongated in a longitudinal direction of the supporting pipe on the inner periphery of the fixing member facing the supporting pipe; and wherein each of the plurality of protruding portions provides a weld portion between the fixing member and the supporting pipe.

With the aforementioned arrangement of the present invention, the wiper motor is held via the holding means having the mounting member and the fixing member on the elongated supporting pipe for supporting the wiper linkage inside the vehicle. Also, the fixing member is welded so as to grip the supporting pipe. A plurality of protruding portions, each of which is elongated in the longitudinal direction of the supporting pipe, are respectively located at each weld portion between the fixing member and the supporting pipe, i.e., on the inside periphery of the fixing member, so that the protruding portions are welded to the surface of the supporting pipe. Since the longitudinal direction of the protruding portions to be welded is provided along the longitudinal direction of the supporting pipe, the bending moment generated, in the circumferential direction of the supporting pipe, in the holding member is distributed by the protruding portions in the longitudinal direction of the supporting pipe. Accordingly, the wiper motor can be surely held to the wiper linkage.

As described above, the wiper apparatus of the present invention can enhance the welding strength of the holding means to which the wiper motor is mounted and the supporting pipe fixed to the vehicle body and supporting the wiper linkage in the circumferential direction of the supporting pipe and can obtain reliable sufficiency for holding the wiper motor to the wiper linkage.

DESCRIPTION OF THE PREFERRED EMBODIMENTS

Figure 1A:
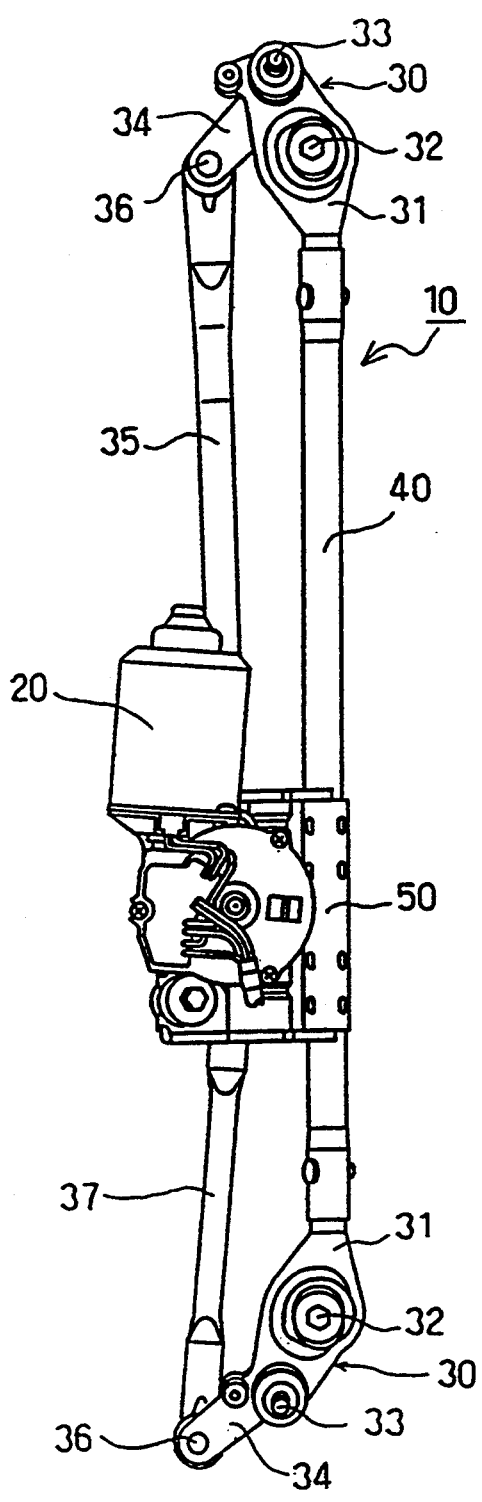
FIG. 1A is a front view of a wiper apparatus according to an embodiment of the present invention.

Referring now to the drawings, an embodiment of a wiper apparatus of the present invention will be explained hereinafter.

Figure 1B:
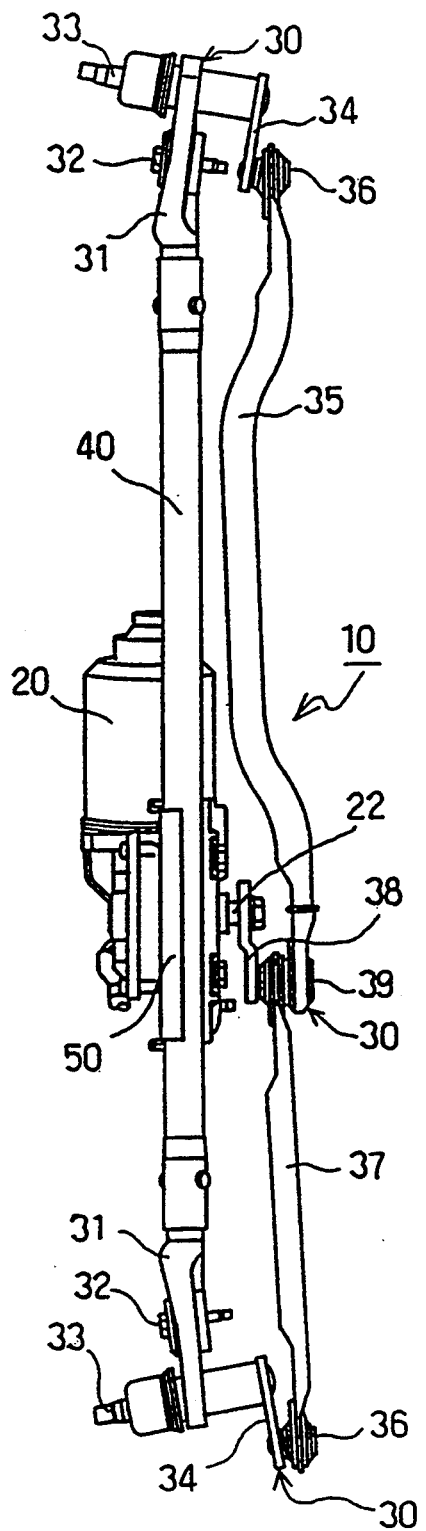
FIG. 1B is a plan view of the wiper apparatus illustrated in FIG. 1A.

FIGS. 1A and 1B illustrate an embodiment of the wiper apparatus of the present invention: FIG. 1A is an overall front view; and FIG. 1B is a plan view of FIG. 1A.

The wiper apparatus 10 of the present invention includes a wiper motor 20, a wiper linkage 30, a supporting pipe 40 with an elongated and cylindrical shape, and a bracket 50 for supporting the wiper motor 20 to the supporting pipe 40.

The wiper linkage 30 is supported by the supporting pipe 40 fixed to a vehicle body (not shown). Pivot holders 31 each of which constitutes a part of the wiper linkage 30 are respectively attached at both ends of the supporting pipe 40. The pivot holders 31 are respectively attached and fixed to a vehicle body (not shown) by inserting a bolt 32 through each of the pivot holders 31. Also, a pivot shaft 33 is supported pivotably to each of the pivot holders 31 and rotates together with a wiper arm (not shown) and a pivot lever 34 of which one end is fixed to each of the pivot shafts 33. Further, the respective one ends of link rods 35, 37 which are of different shapes are rotatably supported via relay shafts 36 at the respective other ends of pivot levers 34. The respective other ends of the link rods 35, 37 and one end of a crank arm 38 (see FIG. 1B) are rotatably supported together via a relay shaft 39. In addition, the other end of the crank arm 38 is fixed to an output axis 22 (see FIG. 1B) of the wiper motor 20. Accordingly, the crank arm 38, the link rods 35, 37, and the pivot lever 34 are actuated together with the rotation of the output axis 22, thereby causing the pivot shaft 33 to be reciprocatively rotated.

Figure 2:
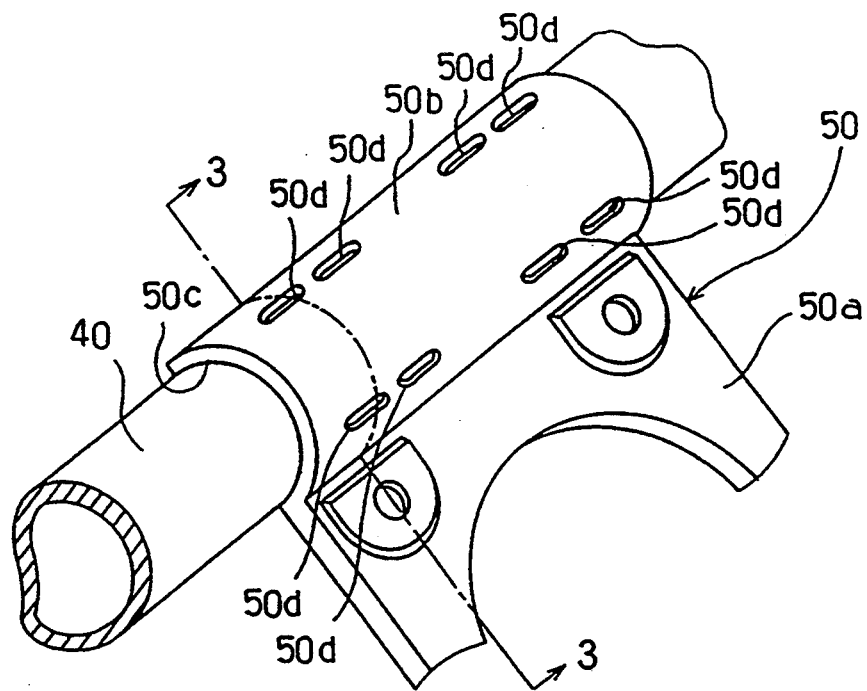
FIG. 2 is an enlarged perspective view of a holding member in the embodiment of the present invention.

On the other hand, the wiper motor 20 is supported to the supporting pipe 40 by a bracket 50 which serves as a holding member of the present invention. The bracket 50 includes, as illustrated in FIG. 2, a mounting portion 50a to which the wiper motor is mounted by bolts or the like and a grip portion 50b having a substantially C-shaped cross-section, which is formed integrally with the mounting portion 50a and grips the supporting pipe 40. Also, a plurality of a substantially elliptical protruding portions 50d which are elongated in the longitudinal direction of the supporting pipe 40 are formed by embossing on the inside periphery 50c of the grip portion 50b. In the present embodiment, the plurality of protruding portions 50d are located at predetermined intervals on two straight lines along the longitudinal direction of the supporting pipe 40 such that four protruding portions are disposed on each line resulting in eight protruding portions in all.

Figure 3:
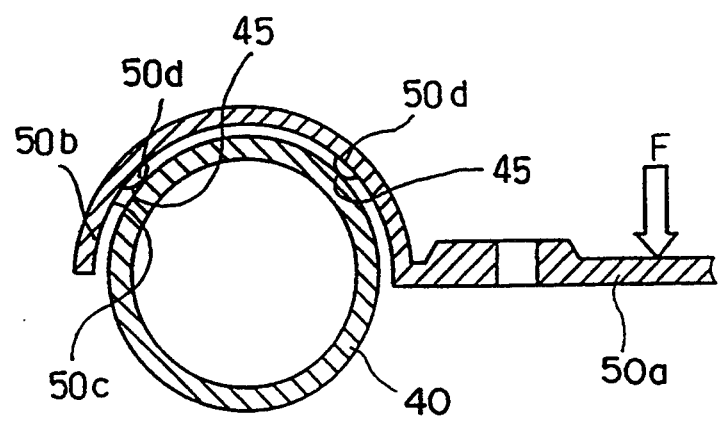
FIG. 3 is a sectional view taken along the line 3—3 of FIG. 2.

In addition, each of the protruding portions 50d which are located on the inner periphery 50c of the grip portion 50b is processed by resistance welding, i.e., protrusion welding, to the surface of the supporting pipe 40 so that weld portions are formed respectively between each of protruding portions 50d and the supporting pipe 40, as illustrated in FIG. 3 (i.e., a sectional view taken on the line 3—3 of FIG. 2).

Consequently, even if a load is imparted from outside of the wiper apparatus 10 due to vehicle vibration generated during the running of the vehicle and the locking of the wiper arm and moment F is generated via the wiper linkage 30 and the wiper motor 20 in the mounting portion 50a of the bracket 50, e.g., in the direction as illustrated in FIG. 3, the bending moment generated in the weld portions 45 is distributed in the longitudinal direction of the supporting pipe 40 since the plurality of protruding portions 50d are respectively formed along the longitudinal direction of the supporting pipe 40 and are welded to the supporting pipe 40. As a result, the welding strength between the supporting pipe 40 and the bracket 50 is enhanced.

Although, in the present embodiment, the protruding portion serving as the weld portion is formed with a substantially elliptical configuration which is elongated in the longitudinal direction of the supporting pipe, the present invention does not need to be limited to the same. The shape of the protruding portion can be changed to, e.g., a rectangular configuration which is elongated in the longitudinal direction of the supporting pipe, but only if it is elongated in the longitudinal direction of the supporting pipe. Further, although in the present embodiment the protruding portions are positioned on two straight lines along the longitudinal direction of the supporting pipe such that four protruding portions are located on each straight line resulting in eight protruding portions in all, the number of protruding portions is not limited to the same. For example, the protruding portions may be located on three straight lines in the longitudinal direction of the supporting pipe such that five protruding portions are located on each line resulting in fifteen protruding portion in all. And, of course, it is possible to enhance the welding strength between the supporting pipe and the bracket even more by increasing the number of protruding portions, i.e., weld portions.

What is claimed is:

1. A wiper apparatus, comprising:
    a wiper linkage including a pivot lever which is connected to a pivot shaft of a wiper arm for wiping a windshield glass of a vehicle, a pivot holder for supporting said pivot shaft, a link rod which is rotatably connected to said pivot lever, and a crank arm which is rotatably connected to said link rod;
    a wiper motor which rotates said crank arm and moves said link rod reciprocatively;
    an elongated supporting pipe which is fixed to said vehicle and supports said wiper linkage;
    holding means which holds said wiper motor to said supporting pipe;
    wherein said holding means includes a mounting member to which said wiper motor is mounted and a fixing member for fixing said mounting member to said supporting pipe, wherein said fixing member includes a plurality of protruding portions which are elongated in a longitudinal direction of said supporting pipe on the inner periphery of said fixing member facing the supporting pipe, and further wherein each of said plurality of protruding portions provides a weld portion between said fixing member and said supporting pipe.

2. A wiper apparatus according to claim 1, wherein said fixing member is disposed along the outer periphery of said supporting pipe.

3. A wiper apparatus according to claim 1, wherein said fixing member has a substantially C-shaped cross-section in a perpendicular direction to an axis of said supporting pipe.

4. A wiper apparatus according to claim 1, wherein said fixing member is integrally formed with said mounting member.

5. A wiper apparatus according to claim 1, wherein said plurality of protruding portions are provided in at least two rows along the longitudinal direction of said supporting pipe.

6. A wiper apparatus according to claim 5, wherein said plurality of protruding portions are provided such that at least four protruding portions are located for each of said at least two rows.

7. A wiper apparatus according to claim 1, wherein each of said plurality of protruding portions has a substantially elliptical shape as seen from the inner periphery of said fixing member.

8. A wiper apparatus according to claim 1, wherein each of said plurality of protruding portions have a substantially rectangular shape as seen from the inner periphery of said fixing member.

9. A wiper apparatus according to claim 1, wherein said weld portion is formed by resistance welding.

10. A wiper apparatus according to claim 1, wherein each of said plurality of protruding portions is formed by embossing from the outer periphery surface of said fixing member.

11. A wiper apparatus, comprising:

a wiper linkage including a pivot lever which is connected to a pivot shaft of a wiper arm for wiping a windshield glass of a vehicle, a pivot holder for supporting said pivot shaft, a link rod which is rotatably connected to said pivot lever, and a crank arm which is rotatably connected to said link rod;

a wiper motor which rotates said crank arm and moves said link rod reciprocatively;

an elongated supporting pipe which is fixed to said vehicle and supports said wiper linkage;

holding means which holds said wiper motor to said supporting pipe;

wherein said holding means includes a mounting member to which said wiper motor is mounted and a fixing member for fixing said mounting member to said supporting pipe, wherein said fixing member is disposed along the outer periphery of said supporting pipe and has a substantially C-shaped cross-section in a perpendicular direction to an axis of said supporting pipe and said fixing member includes a plurality of protruding portions which are elongated in a longitudinal direction of said supporting pipe on the inner periphery of said fixing member facing the supporting pipe, and further wherein each of said plurality of protruding portions provides a weld portion between said fixing member and said supporting pipe.

12. A wiper apparatus according to claim 11, wherein said fixing member is integrally formed with said mounting member.

13. A wiper apparatus according to claim 11, wherein each of said plurality of protruding portions have a substantially elliptical shape as seen from the inner periphery of said fixing member.

14. A wiper apparatus according to claim 13, wherein said plurality of protruding portions are provided in at least two rows along the longitudinal direction of said supporting pipe.

15. A wiper apparatus according to claim 14, wherein said plurality of protruding portions are provided such that at least four protruding portions are located for each of said two rows.

16. A wiper apparatus according to claim 11, wherein each of said plurality of protruding portions has a substantially rectangular shape as seen from the inner periphery of said fixing member.

17. A wiper apparatus according to claim 16, wherein said plurality of protruding portions are provided in at least two rows along the longitudinal direction of said supporting pipe.

18. A wiper apparatus according to claim 17, wherein said plurality of protruding portions are provided such that at least four protruding portions are located for each of said two rows.

19. A wiper apparatus according to claim 11, wherein said weld portion is formed by resistance welding.

20. A wiper apparatus according to claim 11, wherein each of said plurality of protruding portions is formed by embossing from the outer periphery surface of said fixing member.

* * * * *